US011894209B2

(12) United States Patent
Schu

(10) Patent No.: US 11,894,209 B2
(45) Date of Patent: Feb. 6, 2024

(54) COMPONENT OR ELECTRON CAPTURE SLEEVE FOR AN X-RAY TUBE AND X-RAY TUBE HAVING SUCH A DEVICE

(71) Applicant: COMET AG, Flamatt (CH)

(72) Inventor: André Schu, Hamburg (DE)

(73) Assignee: COMET AG, Flamatt (CH)

( * ) Notice: Subject to any disclaimer, the term of this patent is extended or adjusted under 35 U.S.C. 154(b) by 207 days.

(21) Appl. No.: 17/275,021

(22) PCT Filed: Sep. 14, 2018

(86) PCT No.: PCT/EP2018/074840

§ 371 (c)(1),
(2) Date: Mar. 10, 2021

(87) PCT Pub. No.: WO2020/052773

PCT Pub. Date: Mar. 19, 2020

(65) Prior Publication Data

US 2022/0068586 A1 Mar. 3, 2022

(51) Int. Cl.
*H01J 35/16* (2006.01)
*H01J 35/06* (2006.01)
*H01J 35/14* (2006.01)

(52) U.S. Cl.
CPC ............ *H01J 35/16* (2013.01); *H01J 35/066* (2019.05); *H01J 35/147* (2019.05); *H01J 2235/083* (2013.01); *H01J 2235/168* (2013.01)

(58) Field of Classification Search
CPC ........ H01J 35/16; H01J 35/066; H01J 35/147; H01J 2235/083; H01J 2235/168
See application file for complete search history.

(56) References Cited

U.S. PATENT DOCUMENTS

| | | | | |
|---|---|---|---|---|
| 5,111,494 A * | 5/1992 | Turner | .................... | H01J 35/14 378/138 |
| 2003/0086533 A1 | 5/2003 | Janik et al. | | |
| 2008/0112538 A1 | 5/2008 | Rogers | | |

FOREIGN PATENT DOCUMENTS

| | | |
|---|---|---|
| DE | 4230047 C1 | 10/1993 |
| DE | 19544203 A1 | 6/1997 |

(Continued)

OTHER PUBLICATIONS

Notification of Reasons for Refusal for the Japanese Patent Application No. 2018-164758 dated Nov. 4, 2022, 6 pages (3 pages of English Translation and 3 pages of Original Copy).

(Continued)

*Primary Examiner* — Chih-Cheng Kao
(74) *Attorney, Agent, or Firm* — Amster, Rothstein & Ebenstein LLP

(57) ABSTRACT

A component part in a vacuum area of an X-ray tube with an opening through which an electron beam is guided. The component part includes a base body made of a first material, wherein the first material is a metal. Arranged on a surface forming the opening is a second material having an atomic number which is smaller than an atomic number of the first material. A target support is attached to an end of the component part. The target support supports a target which is aligned with a lens diaphragm formed at the end of the component part. The target support has a base body made of a first material which is a metal, and a second material formed on a surface of the base body that is selectively exposed to the electron beam and which extends between the target and the lens diaphragm.

24 Claims, 1 Drawing Sheet

(56) References Cited

FOREIGN PATENT DOCUMENTS

| | | | | | |
|---|---|---|---|---|---|
| DE | 102006062454 | A1 | | 7/2008 | |
| GB | 762375 | A | | 11/1956 | |
| JP | H07057677 | A | | 3/1995 | |
| JP | 2005203358 | A | | 7/2005 | |
| JP | 2005276760 | A | | 10/2005 | |
| JP | 2006185827 | A | | 7/2006 | |
| JP | 2018116928 | A | | 7/2018 | |
| WO | WO-2018066135 | A1 | * | 4/2018 | ............. G01N 23/04 |

OTHER PUBLICATIONS

Office Action received for the Japanese Patent Application No. 2018-164758 dated Mar. 4, 2022, 9 pages (5 pages of English Translation and 4 pages of Original Copy).
Examination Report received for the German Patent Application No. 102017120285.4, dated Feb. 23, 2021, 4 pages.

* cited by examiner

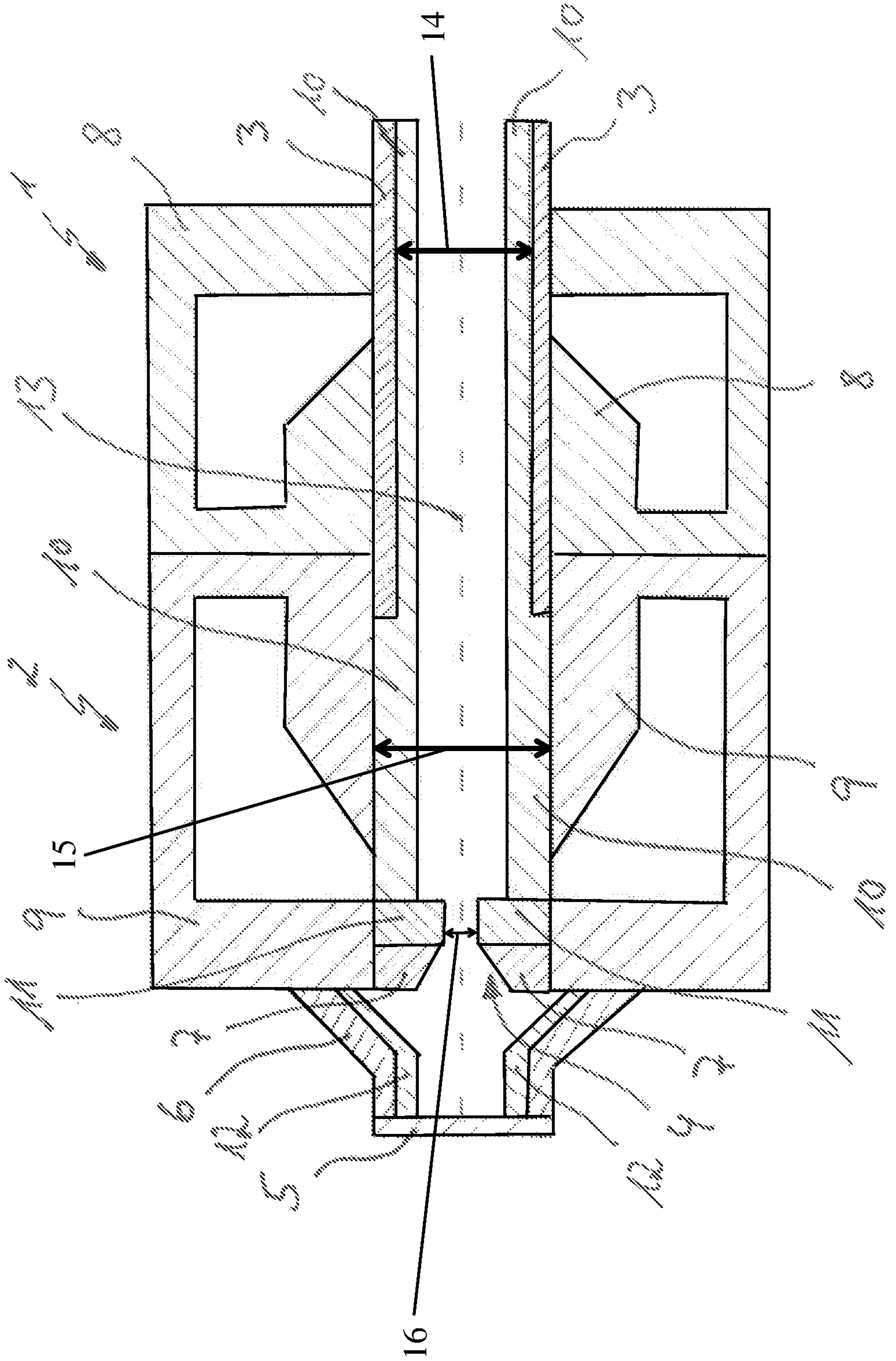
14
15
16

COMPONENT OR ELECTRON CAPTURE SLEEVE FOR AN X-RAY TUBE AND X-RAY TUBE HAVING SUCH A DEVICE

CROSS-REFERENCE TO RELATED APPLICATION

This application claims priority to PCT application no. PCT/EP2018/074840, filed Sep. 14, 2018, the content of which is incorporated by reference in its entirety.

FIELD OF INVENTION

The invention relates to a component part in the vacuum area of an X-ray tube with an opening through which an electron beam is guided, an electron capture sleeve as well as an X-ray tube, in particular a microfocus X-ray tube.

BACKGROUND OF RELATED ART

In microfocus X-ray tubes, the tube current is not the current that generates the useful radiation in the target or the anode. If the electron optics are set to the highest resolution, only approx. 2.5% of the electrons strike the target. The remaining 97.5% of the electrons strike component parts of the X-ray tube on the path from the cathode to the target. A large proportion of these electrons is absorbed in the lens diaphragm as the latter greatly restricts the electron beam. The remaining electrons of the 97.5% have already previously struck parts of the electron optics. Usually, the component parts consist of metals—such as iron (cores of the coils), titanium or molybdenum—and form the vacuum seal to the outside. In all named cases, stray radiation is generated. A further source of stray radiation is electrons backscattered from the target. In order that the latter do not produce a second focal spot on the target or strike the target support, a so-called electron capture sleeve that absorbs these electrons is fitted near the target. In the process, stray radiation likewise forms, which increases the overall image brightness and degrades the contrasts. Due to the proximity to the target, the electron capture sleeve must be able to be subjected to high temperatures. For this reason, it likewise often consists of a metal such as molybdenum. Previously, the inhomogeneity in the brightness was corrected in 2D image acquisitions via a detector adjustment. However, this correction is only effective in an arrangement with a specific distance of the detector from the focus of the X-ray tube and a centering which is not stable over the long term. For 3D images, this image error can be corrected only with great difficulty using the software.

The image quality in the case of X-ray tubes, in particular in the case of microfocus X-ray tubes, is impaired in that an interfering bright circular disc often appears in the generated X-ray image. This circular disc is caused by scattered X-radiation which—as indicated above—forms when electrons strike the diaphragm body of a lens diaphragm of the X-ray tube. As the diaphragm body must be high-temperature-resistant and therefore consists in particular of metal, when the electrons strike the diaphragm body short-wave X-radiation forms which penetrates the target and projects an image of the diaphragm pinhole onto the image receptor when higher energies of the electrons are used.

In DE 10 2006 062 454 A1 a microfocus X-ray tube is described which solves this problem by means of a coating of the diaphragm. The metal of the diaphragm is coated with a material with a low atomic number in order to reduce the stray radiation. It is disadvantageous here that coatings are usually only possible in the micrometre range. For example, a carbon coating of approximately 4 μm is possible. The penetration depth of the electrons is, however, significantly over 4 μm in the case of high energies, as a result of which the electrons penetrate into the metal and generate stray radiation. Moreover, the diaphragm is exposed to high thermal loads. In the case of coated diaphragms this often leads to a peeling of the coating.

SUMMARY

The object of the invention is therefore to reduce, or ideally prevent, the formation of stray radiation between cathode and target.

The object is achieved by a component part according to the features of claim 1. As the surface of the opening of the component part through which the electron beam extends is made according to the invention of a second material of a lower atomic number (and density) than the metal of the base body, and the electrons of the electron beam which passes through the opening thus strike the second material and not the metal, the proportion of short-wave X-rays is reduced due to the lower atomic number of the second material. A smaller portion of stray radiation can thus penetrate the target and cause image errors.

An advantageous development of the invention provides that the component part is a beam tube or a core of a coil which has a tubular opening, or is a diaphragm which has an annular opening, or is a combination of several of the above-named component parts. The named component parts are the essential component parts that are located on the path of the electron beam from the cathode to the target and through which the electron beam must pass. It is thereby ensured with an embodiment according to the invention of these component parts that no stray radiation is generated in these component parts—at least in the areas that are covered by the second material. With a combination of several of the named component parts, the second material can also cover the relevant component parts in one piece so that fewer additional parts need be introduced into the X-ray tube.

The object is also achieved by a target support with the features of claim 3. The second material which covers the base body between lens diaphragm and target serves for the absorption of the electrons backscattered from the target. Thus it is also achieved that no stray radiation can be generated in the area between lens diaphragm and target. If the second material is used in the form of a separate additional part, this is denoted electron capture sleeve within the framework of this application.

A further advantageous development of the invention provides that the first material is a metal such as molybdenum, iron, tungsten or titanium. The first material of which the base body consists can be chosen according to the respective requirements, in particular with regard to a high temperature resistance or magnetic properties, within a broad range. The above-named metals are particularly suitable. A further advantageous development of the invention provides that the second material is aluminium, beryllium, silicon, carbon—in particular in the form of graphite—boron or a chemical compound of one or more of these elements. The second material can also be chosen according to the respective requirements within a broad range. Corresponding to the function of the additional body consisting of the second material, the material has a low atomic number. The materials listed for the base body and the second material which can be formed for example as a separate additional body have atomic numbers clearly different from each other.

The difference between the atomic numbers of first material and second material is preferably at least 16, particularly preferably at least 36. For this reason, carbon (with the atomic number 6) is readily used for the second material and molybdenum (with the atomic number 42) is readily used for the first material. The materials according to the invention must be heat-resistant and have a high thermal conductivity as they are intensely heated as a result of the electron bombardment or the exposure to the scattered X-radiation generated in the target. The materials must also not permit magnetization as this would interfere with the fields inside the X-ray tube.

A further advantageous development of the invention provides that the second material is applied in the form of a coating or a foil on the surface of the first material, or the second material is formed as a separate additional body, in particular as a tubular additional body. A coating or foil has the advantage that they are thin and thus scarcely reduce the cross-section of the opening through which the electron beam must pass; thus conventional component parts can be used as the cross-section of the component part need not be enlarged so that the electron beam can still pass through the opening. However, the disadvantage of such a thin layer of the second material is that the electrons can penetrate it and generate stray radiation in the first material lying beneath it. This is less critical for component parts lying far away from the target than for component parts that lie in direct proximity to the target. It is advantageous for such last-named component parts to be composed of a separate additional body made of the second material, as the latter can be formed thicker than the first-named thin layers. In the case of an additional body with a larger wall thickness of the tube, the cross-section of the component part may possibly need to be enlarged. An additional body also has the advantage compared with the above-named thin layers that it is easier to produce and can be changed more easily.

A further advantageous development of the invention provides that the additional body rests against the surface of the base body over its whole surface. It is thereby achieved in particular with a tubular additional body that, with a predefined wall thickness of the tubular additional body, the inner diameter of the tubular additional body is as large as possible. Due to the fact that it rests along the whole length—in the beam direction of the electron beam—no electrons of the electron beam can strike the first material of the base body at any point.

A further advantageous development of the invention provides that the additional body covers several component parts with respect to the electron beam. Thus with a single additional body, for example the beam tube together with the cores of all coils can be covered, with the result that assembly is possible very easily as only a single additional part need be introduced into the X-ray tube.

The object is also achieved by an X-ray tube with the features of claim 9. For this, the advantages specified above in relation to the component part according to the invention and to the electron capture sleeve according to the invention respectively also result.

A further advantageous development of the invention provides that the X-ray tube is constructed such that the electron beam cannot strike the first material, but only the second material, at any point on its whole path from the cathode to the target. Thus the generation of any stray radiation is completely prevented.

Further advantages and details of the invention are explained in more detail in the following with reference to the embodiment example represented in the figures.

BRIEF DESCRIPTION OF THE DRAWINGS

The single FIG. shows: a drawing of a longitudinal section through a part of an X-ray tube with an additional body according to the invention.

DETAILED DESCRIPTION

A detail of a microfocus X-ray tube according to the invention in the area of its condenser 1 and its objective 2 up to a target 5 is represented in a schematic longitudinal section in the FIG. The rest of the microfocus X-ray tube, not represented, corresponds to the state of the art and is not relevant to the invention. Instead of a microfocus X-ray tube, it can also be another type of X-ray tube.

Condenser 1 and objective 2 are arranged around a beam tube 3 for an electron beam 13—shown as a dashed line. The condenser 1 lies in front of the objective 2 in the direction of the electron beam 13.

The condenser 1 contains a condenser coil only the condenser core 8 of which is represented. The objective 2 is connected to the condenser coil in the propagation direction of the electron beam 13. The objective 2 contains an objective coil only the objective core 9 of which is represented.

The beam tube 3 extends in the propagation direction of the electron beam 13 beyond the end of the condenser 1 into the area of the objective 2.

A lens diaphragm 4 is connected to the objective 2 in the propagation direction of the electron beam 13.

In order to prevent electrons of the electron beam 13 from striking the beam tube 3, which is made of a metal, or the surfaces, facing the electron beam 13, of the condenser core 8 as well as the objective core 9, which both consist of iron, and thereby generating stray radiation because of the high atomic number of the materials used, there is arranged between these surfaces and the electron beam 13 an additional body 10 which consists of graphite. Because graphite with a low atomic number is used in the additional body 10, if the latter is struck by electrons of the electron beam 13 only long-wave X-radiation forms. Thus the proportion of short-wave X-radiation is reduced, with the result that no stray radiation, or only a very small portion of it, can form.

The additional body 10 extends in longitudinal direction over the whole length of the beam tube 3 and of the objective 2 up to the lens diaphragm 4. It is formed in one piece and rests with its outer surface against the opening 14 of the beam tube 3 and against the opening 15 of the objective core 9. Its inner surface is formed cylindrical. Because of the step between the end of the beam tube 3 and the objective core 9, its outer surface is formed as a cylinder with a step and has a tubular shape.

The lens diaphragm 4 has a lens diaphragm-base body 7 and arranged in front of it a lens diaphragm-additional body 11 in the propagation direction of the electron beam 13. The lens diaphragm 4 serves with its opening 16 to restrict the electron beam 13, and thus the focus which serves to generate X-radiation on a target 5 in the X-ray tube.

The lens diaphragm-base body 7 is made of a first material which must be heat-resistant to a high degree due to its position in the X-ray tube and must have a high thermal conductivity in order to remove the heat generated in it. Moreover, it must as far as possible exert no magnetic influence in order not to interfere with the electric fields in the X-ray tube. It is preferably made of a metal, as are the diaphragms known in the state of the art, in particular of molybdenum, tungsten or titanium.

The lens diaphragm-additional body 11 is made of a second material which must also—like the first material—be heat-resistant to a high degree due to its position in the X-ray tube and must have a high thermal conductivity in order to remove the heat generated in it. Moreover, it must as far as possible exert no magnetic influence in order not to interfere with the electric fields in the X-ray tube. In order to prevent the electrons of the electron beam 13, which strike the lens diaphragm 4, from generating interfering X-radiation, the lens diaphragm-additional body 11 must be made of a material which generates as little as possible and preferably considerably softer X-radiation than that which is generated in the target 5. It is therefore manufactured from a carbon compound, beryllium or aluminium—particularly preferably from graphite. As graphite has a low atomic number, the proportion of short-wave X-radiation is reduced, with the result that only a very small portion of stray radiation penetrates the target 5 and can cause image errors.

The opening 16 of the lens diaphragm 4 widens conically in the propagation direction of the electron beam 13, so that any electrons of the electron beam 13 scattered on the lens diaphragm-additional body 11 cannot strike the metal of the lens diaphragm-base body 7, which would result in the generation of stray radiation.

Such a lens diaphragm is described in DE 10 2016 013 747.

As an alternative to the represented lens diaphragm 4 with a division in the propagation direction of the electron beam 13 into lens diaphragm-base body 7 and lens diaphragm-additional body 11 shielding same, a lens diaphragm 4 according to the invention could be designed such that the shield of the lens diaphragm-additional body 11 is arranged in radial direction—relative to the electron beam 13—around the lens diaphragm-base body 7, wherein the lens diaphragm-base body 7 does not project radially over the end of the tubular additional body 10 to which it is connected. It is also then achieved that no electrons of the electron beam 13 can strike the metal of the lens diaphragm-base body 7, which would generate stray radiation.

The target 5—a transmission target in the embodiment example represented—which is secured to a target support 6 connected to the objective 2, is connected to the lens diaphragm 4 in the propagation direction of the electron beam 13.

The target support 6 forms the vacuum seal between objective core 9 and target 5 in the front area of the microfocus X-ray tube. It serves to mechanically stabilize the target 5, as the latter is only approximately 300 μm thick in some areas. It is helpful for the best possible removal of the heat that forms on the target 5 if the target support 6 consists of a metal such as for example brass. As a portion of the electrons are backscattered when the electron beam 13 strikes the target 5, these could strike the target support 6. Then stray radiation would form in the target support 6.

In order to prevent this, the whole surface of the target support 6 between objective 2 and target 5 is covered with a body made of graphite which is denoted electron capture sleeve 12. The electron capture sleeve 12 is formed like the additional body 10 in one piece and rests against the whole surface of the target support 6 facing the electron beam 13. The electron capture sleeve 12 is at earth potential in order to be able to directly remove backscattered electrons. Because of the proximity to the target 5 and to the focal spot, the material of the electron capture sleeve 12 must tolerate high temperatures and must not interfere with the trajectory of the electrons. A metal such as for example molybdenum is often used for the electron capture sleeve 12. If a metal is used, the electron capture sleeve 12 would itself in turn generate stray radiation. Therefore a material with a low atomic number and density is to be preferred.

Because of the additional parts according to the invention, additional body 10 and electron capture sleeve 12 in conjunction with the lens diaphragm-additional body 11, electrons of the electron beam 13 are prevented from generating stray radiation at any point, with the result that no image errors are caused by stray radiation.

LIST OF REFERENCE NUMBERS

1 condenser
2 objective
3 beam tube
4 lens diaphragm
5 target
6 target support
7 lens diaphragm-base body
8 condenser core
9 objective core
10 additional body
11 lens diaphragm-additional body
12 electron capture sleeve
13 electron beam
14 opening of the beam tube
15 opening of the objective core
16 opening of the lens diaphragm

What is claimed is:

1. A component part in a vacuum area of an X-ray tube with an opening through which an electron beam is guided, the component part including a beam tube, the component part comprising:

a base body made of a first material, wherein the first material is a metal and the beam tube is made from the first material, at least one of a core of a coil which forms at least a portion of the opening; and wherein arranged on a surface forming the opening which includes the beam tube, said surface being selectively exposed to the electron beam, is a second material having an atomic number which is smaller than an atomic number of the first material.

2. The component part according to claim 1, wherein the first material is one of molybdenum, iron, tungsten or titanium; and the second material is aluminum, beryllium, silicon, carbon, boron or a chemical compound of one or more of these elements of the second material.

3. The component part according to claim 1, wherein the atomic numbers of the first material and the second material differ by at least 16.

4. The component part according to claim 1, wherein the second material is formed as a separate additional body in a form of at least one tubular additional body.

5. The component part according to claim 4, wherein the at least one tubular additional body rests against an entire surface of the base body.

6. The component part according to claim 4, wherein the at least one tubular additional body covers several component parts exposed to the electron beam.

7. A microfocus X-ray tube configured to direct the electron beam onto a target, and the component part according to claim 1 arranged in a propagation path of the electron beam.

8. The microfocus X-ray tube according to claim 7, wherein the X-ray tube is constructed such that the electron beam cannot strike the first material, but only the second material at any point along the propagation path of the electron beam from a cathode to the target.

9. The component part according to claim 1, wherein the second material is graphite.

10. The component part according to claim 1, wherein the atomic numbers of the first material and the second material differ by at least 36.

11. The component part according to claim 1, wherein the second material is applied in a form of a coating or a foil on a surface of the first material.

12. A microfocus X-ray tube including the component part of claim 1, the microfocus X-ray tube configured to direct the electron beam onto a target which is attached to an end of the component part, the target being made from the first material with the second material provided thereon, wherein the target and the component part are arranged in a propagation path of the electron beam.

13. An apparatus comprising:
- a component part suitable for implementation in a vacuum area of an X-ray tube with an opening through which an electron beam is guided, the component part including:
- a beam tube for directing the electron beam to a target;
- a base body made of a first material, wherein the first material is a metal;
- wherein arranged on an interior surface forming the opening, is a second material having an atomic number which is smaller than an atomic number of the first material; and the apparatus further comprising:
- a target support attached to an end of the component part, the target support supporting the target which is aligned with a lens diaphragm formed at an end of the beam tube, the target support having a second base body made of the first material, and the second material being formed on a surface of the second base body that is selectively exposed to the electron beam and which extends between the target and the lens diaphragm.

14. A microfocus X-ray tube including the apparatus of claim 13, the microfocus X-ray tube configured to direct the electron beam onto the target which is attached to the end of the component part by the target support, the target and the target support being made from the first material with the second material provided thereon, wherein the target, the target support and the component part are arranged in a propagation path of the electron beam.

15. The apparatus according to claim 13, wherein the first material is one of molybdenum, iron, tungsten or titanium; and the second material is aluminum, beryllium, silicon, carbon, boron or a chemical compound of one or more of these elements of the second material.

16. The apparatus according to claim 13, wherein the second material is graphite.

17. The apparatus according to claim 13, wherein the atomic numbers of the first material and the second material differ by at least 16.

18. The apparatus according to claim 13, wherein the atomic numbers of the first material and the second material differ by at least 36.

19. The apparatus according to claim 13, wherein the second material is applied in a form of a coating or a foil on a surface of the first material.

20. The apparatus according to claim 13, wherein the second material is formed as a separate additional body in a form of at least one tubular additional body.

21. The apparatus according to claim 20, wherein the separate additional body rests against an entire surface of the base body.

22. The apparatus according to claim 20, wherein the at least one tubular additional body covers several component parts exposed to the electron beam.

23. A microfocus X-ray tube including the apparatus of claim 13, the microfocus X-ray tube configured to direct the electron beam onto the target, and wherein the component part is arranged in a propagation path of the electron beam.

24. The microfocus X-ray tube according to claim 23, wherein the X-ray tube is constructed such that the electron beam cannot strike the first material, but only the second material at any point along the propagation path of the electron beam from a cathode to the target.

* * * * *